United States Patent
Al-Shehab et al.

(10) Patent No.: US 12,235,814 B1
(45) Date of Patent: Feb. 25, 2025

(54) COMPUTER-BASED SYSTEMS CONFIGURED FOR DATABASE RESOLUTION FROM AN ENHANCED QUERY DATA REFINEMENT IN AN ELASTIC SEARCH ENVIRONMENT AND METHOD AN USE THEREOF

(71) Applicant: Capital One Services, LLC, McLean, VA (US)

(72) Inventors: Ali S. Al-Shehab, Medford, MA (US); Jr-Wei Jeng, Marlboro, NJ (US); Niti N. Sheth, Edison, NJ (US); Tanveer Afzal Faruquie, Scarsdale, NY (US); David Edward Lutz, Tarrytown, NY (US); Nathan L. Sheridan, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/604,275

(22) Filed: Mar. 13, 2024

(51) Int. Cl.
  *G06F 16/215* (2019.01)
  *G06F 16/22* (2019.01)
  *G06F 16/28* (2019.01)

(52) U.S. Cl.
  CPC ........ *G06F 16/215* (2019.01); *G06F 16/2228* (2019.01); *G06F 16/285* (2019.01)

(58) Field of Classification Search
  CPC ... G06F 16/215; G06F 16/285; G06F 16/2228
  USPC .......................................................... 707/692
  See application file for complete search history.

(56) References Cited

U.S. PATENT DOCUMENTS

| | | | |
|---|---|---|---|
| 10,713,577 B1* | 7/2020 | Faruquie | G06N 5/022 |
| 11,514,321 B1* | 11/2022 | Chen | G06N 3/08 |
| 2016/0085852 A1* | 3/2016 | Deshpande | G06F 16/93 |
| | | | 707/736 |
| 2020/0409945 A1* | 12/2020 | Chen | G06F 16/24578 |
| 2021/0224258 A1* | 7/2021 | Faruquie | G06F 16/244 |
| 2021/0311952 A1* | 10/2021 | Jain | G06F 16/24578 |
| 2021/0357378 A1* | 11/2021 | Urdiales | G06N 3/08 |
| 2021/0374525 A1* | 12/2021 | Bremer | G06F 18/214 |
| 2021/0383229 A1 | 12/2021 | Hanna et al. | |
| 2021/0383261 A1 | 12/2021 | Hanna et al. | |
| 2022/0012219 A1* | 1/2022 | Pulipaty | G06F 16/288 |
| 2022/0374735 A1* | 11/2022 | Rathod | G06F 16/9024 |
| 2023/0205740 A1* | 6/2023 | Abdelaal | G06N 20/20 |
| | | | 707/692 |
| 2023/0267156 A1* | 8/2023 | Goel | G06F 16/9532 |
| | | | 707/709 |
| 2023/0316186 A1* | 10/2023 | Miller | G06F 40/40 |
| | | | 705/7.25 |

OTHER PUBLICATIONS

Xu, Lianghong, et al., "Online Deduplication for Databases", SIGMOD '17, Chicago, IL, May 14-19, 2017, pp. 1355-1368.*

(Continued)

*Primary Examiner* — Robert Stevens
(74) *Attorney, Agent, or Firm* — GREENBERG TRAURIG, LLP

(57) ABSTRACT

This disclosure generally relates to computer-based systems configured for one or more novel technological applications of information processing in the field of database resolution from an enhanced query data refinement in an elastic search environment utilizing a machine learning model pipeline to resolve entity records.

19 Claims, 5 Drawing Sheets

(56) References Cited

OTHER PUBLICATIONS

Chen, Qingyu, et al., "Comparative Analysis of Sequence Clustering Methods for Deduplication of Biological Databases", Journal of Data and Information Quality (JDIQ), vol. 9, Issue 3, Article No. 17, Jan. 27, 2018, pp. 1-27.*
Usharani, A. V., et al., "Secure EMR Classification and Deduplication Using MapReduce", IEEE Access, vol. 10, Mar. 22, 2022, pp. 34404-34414.*
Nunes, Igor, et al., "DotHash: Estimating Set Similarity Metrics for Link Prediction and Document Deduplication", KDD '23, Long Beach, CA, Aug. 6-10, 2023, pp. 1758-1769.*
Cousseau, Vincius, et al., "Linking place records using multi-view encoders", Neural Computing and Applications, vol. 33, SpringerLink, Mar. 27, 2021, pp. 12103-12119.*

* cited by examiner

COMPUTER-BASED SYSTEMS CONFIGURED FOR DATABASE RESOLUTION FROM AN ENHANCED QUERY DATA REFINEMENT IN AN ELASTIC SEARCH ENVIRONMENT AND METHOD AN USE THEREOF

FIELD OF TECHNOLOGY

The present disclosure generally relates to computer-based systems configured for one or more novel technological applications of information processing in the field of database resolution from an enhanced query data refinement in an elastic search environment utilizing a machine learning model pipeline to resolve entity records.

BACKGROUND OF TECHNOLOGY

In the age of unlimited data, automated database resolution is a technically challenging field. Available data is in a constant state of change (e.g., non-static, reordering, duplication, noise injection). Non-static data may appear in a database for a few milliseconds or may reside there for months. Data can be processed by multiple sources and appear in multiple arrangements in multiple databases, the data reordered at each step. Duplication can occur as crawlers systematically explore and index data or, by less ordered approaches, such as by for example, social network information or sharing information from social networks. Finally, noise is likely to be injected in each of the described processes as data is handled differently across platforms and languages.

SUMMARY OF DESCRIBED SUBJECT MATTER

In some aspects, the techniques described herein relate to a computer-implemented method including: receiving, by at least one processor, multiple data items associated with multiple entity records corresponding to at least one candidate entity record, the at least one candidate entity record being associated with at least one classification; wherein each of the multiple data items associated with the multiple entity records includes: i) a quantity data item representing a quantity associated with an attribute of each entity record; ii) an entity name data item representing an attribute as a name associated with each entity record; iii) an entity address data item representing an attribute such as an address associated with each entity record; iv) a second set of data items representing at least one attribute associated with the at least one candidate entity record, wherein the second set of data items includes a merged set of the multiple data items; generating, by the at least one processor, a respective set of entity feature vectors associated with each respective entity record based at least in part on each data item of each respective entity record; identifying, by the at least one processor, at least one group of data item feature vectors associated with the multiple data items; utilizing, by the at least one processor, at least one machine learning model to map the multiple entity records to clusters based on the set of entity feature vectors, the feature vectors pertaining to the at least one group of data item feature vectors associated with the multiple data items and the at least one set of candidate entity feature vectors; merging, by the at least one processor, a set of high similarity entity records based on the entity records exceeding a similarity threshold applied to the clusters; utilizing, by the at least one processor, an ingestion module to automatically index clusters of feature vectors into an elastic search, each cluster associated with the at least one candidate entity record; wherein the ingestion module is configured to: index the clusters based on feature vectors determined by the machine learning model based in part on a classification; utilizing, by at least one processor, at least one machine learning model to map a second set of clusters of the feature vectors in the index associated with the set of high similarity entity records and at least one query entity record; merging, by the at least one processor, a second set of entity records associated with at least one query entity record and the corresponding high similarity entity records; and displaying, by the at least one processor, at least one candidate entity record having the record attributes.

In some aspects, the techniques described herein relate to a system including: a non-transient computer memory, storing software instructions; and at least one processor of a first computing devices associated with a user; wherein, then at least one processor executes the software instructions, the first computing device is programmed to: receive, by at least one processor, multiple data items associated with multiple entity records corresponding to at least one candidate entity record, the at least one candidate entity record being associated with at least one classification; wherein each of the multiple data items associated with the multiple entity records includes: i) a quantity data item representing a quantity associated with an attribute of each entity record; ii) an entity name data item representing an attribute as a name associated with each entity record; iii) an entity address data item representing an attribute as an address associated with each entity record; iv) a second set of data items representing at least one attribute associated with the at least one candidate entity record, wherein the second set of data items includes a merged set of the multiple data items; generate, by the at least one processor, a respective set of entity feature vectors associated with each respective entity record based at least in part on each data item of each respective entity record; identify, by the at least one processor, at least one group of data item feature vectors associated with the multiple data items; utilize, by the at least one processor, at least one machine learning model to map the multiple entity records to clusters based on the set of entity feature vectors, the feature vectors pertaining to the at least one group of data item feature vectors associated with the multiple data items and the at least one set of candidate entity feature vectors; merge, by the at least one processor, a set of high similarity entity records based on the entity records exceeding a similarity threshold applied to the clusters; utilize, by the at least one processor, an ingestion module to automatically index clusters of feature vectors into an elastic search, each cluster associated with the at least one candidate entity record; wherein the ingestion module is configured to: index the clusters based on feature vectors determined by the machine learning model based in part on a classification; utilize, by at least one processor, at least one machine learning model to map a second set of clusters of the feature vectors in the index associated with the set of high similarity entity records and at least one query entity record; merge, by the at least one processor, a second set of entity records associated with at least one query entity record and the corresponding high similarity entity records; and display, by the at least one processor, at least one of a second set of entity records.

In some aspects, the techniques described herein relate to at least one computer-readable storage medium having encoded thereon software instructions that, when executed by at least one processor, cause the at least one processor to perform the steps to: receive, by at least one processor, multiple data items associated with multiple entity records corresponding to at least one candidate entity record, the at least one candidate entity record being associated with at least one classification; wherein each of the multiple data items associated with the multiple entity records includes: i) a quantity data item representing a quantity associated with an attribute of each entity record; ii) an entity name data item representing an attribute as a name associated with each entity record; iii) an entity address data item representing an attribute as an address associated with each entity record; iv) a second set of data items representing at least one attribute associated with the at least one candidate entity record, wherein the second set of data items includes a merged set of the multiple data items; generate, by the at least one processor, a respective set of entity feature vectors associated with each respective entity record based at least in part on each data item of each respective entity record; identify, by the at least one processor, at least one group of data item feature vectors associated with the multiple data items; utilize, by the at least one processor, at least one machine learning model to map the multiple entity records to clusters based on the set of entity feature vectors, the feature vectors pertaining to the at least one group of data item feature vectors associated with the multiple data items and the at least one set of candidate entity feature vectors; merge, by the at least one processor, a set of high similarity entity records based on the entity records exceeding a similarity threshold applied to the clusters; utilize, by the at least one processor, an ingestion module to automatically index clusters of feature vectors into an elastic search, each cluster associated with the at least one candidate entity record; wherein the ingestion module is configured to: index the clusters based on feature vectors determined by the machine learning model based in part on a classification; utilize, by at least one processor, at least one machine learning model to map a second set of clusters of the feature vectors in the index associated with the set of high similarity entity records and at least one query entity record; merge, by the at least one processor, a second set of entity records associated with at least one query entity record and the corresponding high similarity entity records; and display, by the at least one processor, at least one of a second set of entity records.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
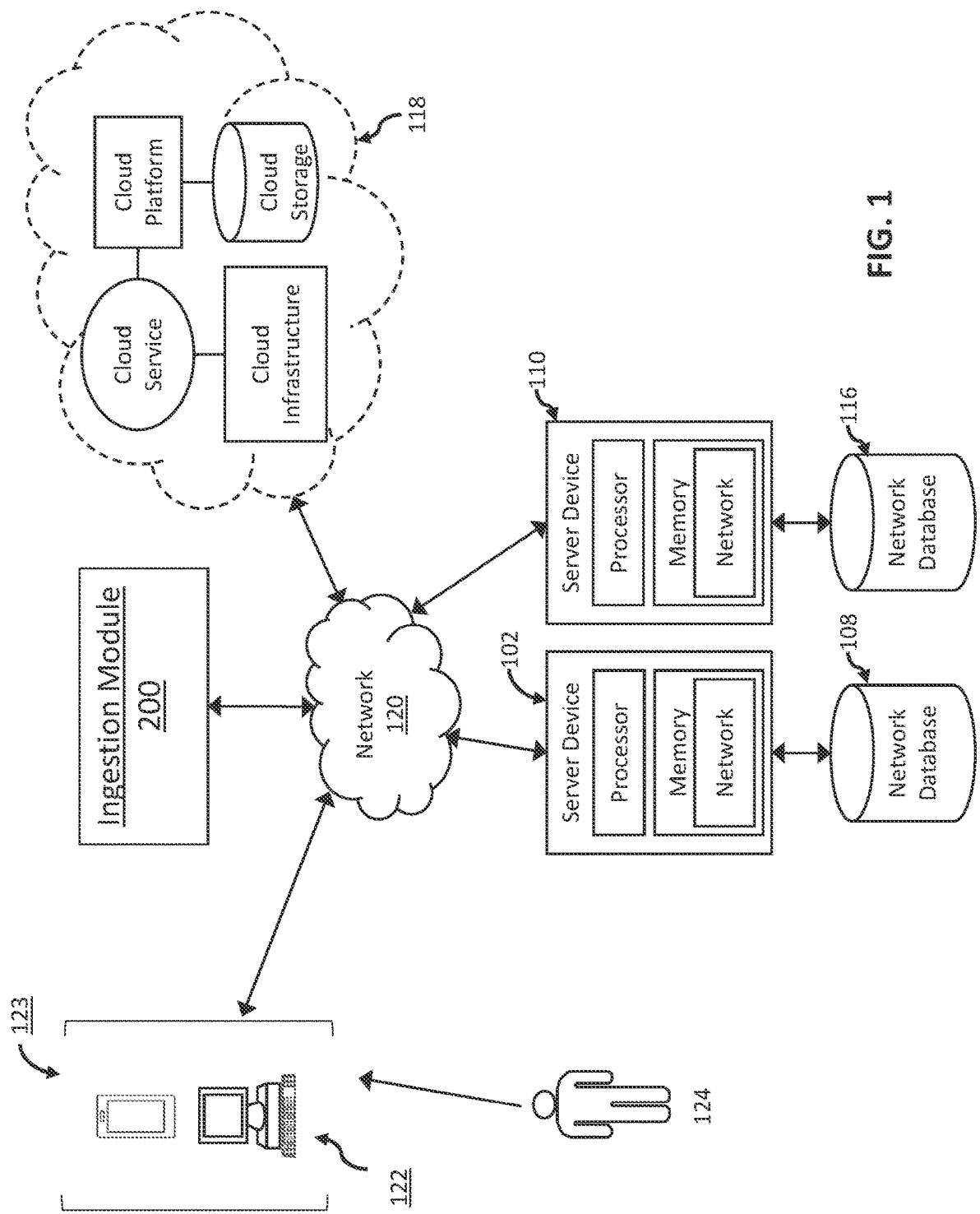
FIG. 1 depicts an illustration of an exemplary computer-based system and platform configured to utilize natural language processing machine learning models to refine data associated with entity records indexed in an enhanced elastic search environment in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive. Entity resolution of large databases is a technically challenging problem, but necessary for any entity interacting with large numbers of users. Entity data can be retrieved from any number of sources such as from websites, public data sources, government websites, social media, news, information sites or data repositories etc. Collecting entity data may be automated, with information systems searching for and retrieving data, however, organizing entity data in a useful manner is not simple task. For example, entity data related to "Joe's auto shop" may be retrieved from many sources, such as a website, a social media site, a small business association listing, a chamber of commerce website, and many other sources. The information available may include only the entity name "Joe's auto shop" and a phone number, or it may include other attributes about the entity such as the owner(s), revenue, number of employees. The information about the entity may be recorded differently at each source, or it may be recorded incorrectly or incompletely. Thus, resolution of data may be leveraged in the process of creating and maintaining a database to reduce memory, network and/or processing resources in the course of maintaining the data and/or responding to queries. Manual resolution (human culled) of data is not feasible in terms of labor expense, and current computer-based information processing systems cannot feasibly perform these operations.

Resolving the correct entity information under these conditions is a formidable challenge. Further, the level of detail of entity information to be resolved depends on the use of the data. For example, in the case where entity resolution is carried out for the purpose of determining a credit score for a potential line of credit, the attributes associated with the entity should be a very high level of detail. A high level of detail information may include for example information about the entity such as revenue, expenses, debts, and other highly detailed information. In the case where entity resolution is carried out for the purpose of sending a marketing email promotion, the level of detail of entity resolution can be low such as for example a business entity name and an associated email address.

Typical information processing systems rely on fuzzy search methods of databases that have been refined manually by a user. User refined databases are resource intensive in terms of labor and time, and do not achieve optimal results for obtaining reliable real-time quarriable data.

One or more embodiments of this disclosure contemplates a system that utilizes natural language processing model(s) (clustering model) to map a first set of entity records, utilizes an ingestion module to classify the first set of entity records and index them into an enhanced elastic search environment, and further utilizes a blocking engine of the entity records indexed to determine a map of the entity records based on a query. The series of natural language processing models utilizing an enhanced elastic search provides improved information processing system for resolving entity data that does not rely on typical fuzzy search methods, does not require user refined data methods. The computer-implemented system provides highly accurate entity data results (e.g., entity records) while decreasing information processing time by training at least two natural language processing models sourcing refined data in an elastic search environment. The computer-implemented system improves information processing techniques by utilizing an enhanced elastic search environment that eliminates the need for recursive search operations, reducing system load. Further, utilizing a series of natural language processing models with an enhanced elastic search the computer-implemented system can resolve entity data of tens of millions of entity records in real-time.

In some embodiments, the computer-implemented system of this disclosure contemplates an illustrative ingestion module configured to utilize at least two natural language processing models, the system is capable of resolving entity records indexed into an enhanced elastic search environment in a database of multiple data items.

In some embodiments, the illustrative ingestion module may operate in at least one cloud platform, at least one network, at least one virtual network, in a computer-based system having at least one server, or it may be configured to operate on at least one personal computing device, or at least one mobile computing device.

In some embodiments, the illustrative ingestion module capable of resolving entity records indexed into an enhanced elastic search environment may retrieve data from any device capable of storing an entity record such as for example a virtual storage device in a network, a memory device within a server, a network database, a cloud storage device, a personal computing device or a mobile computing device. The illustrative ingestion module may utilize an internal processor(s), memory and storage to perform entity record resolution, or it may utilize computer-implemented systems based in a cloud platform, a virtual network, a server device, a network database, a personal computing device or a mobile computing device.

In some embodiments, the illustrative ingestion module may be configured with a bus in communication with a storage device, a system memory (RAM), a network interface communicatively coupled to at least one computer-implemented system, a ROM, an output device interface, an input device interface, at least one processor(s), at least one clustering engine (natural language processing model) capable of determining embeddings between data items associated with entity records, an ingestion engine capable of indexing into an enhanced elastic search environment the entity records determined to share similar embeddings by the at least one clustering engine, a blocking engine (natural language processing model) capable of determining embeddings between data items associated with entity records indexed in the enhanced elastic search environment based on a query of an entity record, a merge engine, capable of merging entity records that have been determined to share similar embeddings, and a display engine capable of displaying on an output device interface, an output pertaining to a merged entity record.

In some embodiments, the illustrative ingestion module may utilize a single data item of an entity record to determine a merge of multiple entity records or it may determine a merge based on multiple data items or all the data items of the entity record. The data items of the entity record may include a business name, an owner's name, an address, a phone number, an email address, an employee's name, information related to revenue, debts, or any other similar data related to an entity that may be related to an entity record.

In some embodiments, the at least one processor(s) may determine a classification of the multiple entity records. The classification may be based on at least one data item of the entity record for example an area code, or a zip code data item of the entity record. The at least one processor(s) may utilize a set of predetermined categories to determine a classification of the multiple entity records. The at least one processor(s) may convert portions of software code containing multiple entity records from one software language to another software language to determine a classification for example from Scala or spark to python. The at least one processor(s) may convert a string of text of an entity record to a numeric character. The at least one processor(s) may determine a similarity between entity records based on a hamming distance, Jaccard similarity, Euclidean distance, or a similar manner of determining a similarity between entity records in order to determine a classification.

In some embodiments, the illustrative ingestion module may utilize predetermined classification categories to determine a classification of the entity records. The predetermined classification categories may include a list of at least one numeric character or text. The text may for example include text of similarly related entity record business types such as, automobile, automobile repair, automobile dealer, etc. In some embodiments the list of predetermined classification categories may be at least one numeric character. The numeric character may for example include a series of numbers associated with an entity record such as a zip code, a telephone number, an account number, a street number or the like.

In some embodiments the illustrative ingestion module may utilize the at least one processor(s) to randomly sample a subset of the multiple entity records to automatically determine a list of classification categories.

In some embodiments the illustrative ingestion module may utilize the at least one processor(s) to augment an entity record associated with a classification category. The augmentation may include at least one text or at least one numeric character, or it may include a sentence.

In some embodiments, the at least one processor(s) may determine a set of entity feature vectors associated with each respective entity records based at least in part on each data item pertaining to the multiple entity records. The feature vector may be determined by utilizing a data item of the entity record for example a zip code, a portion of a zip code, an area code of a telephone number, a trigram of a portion of text of a data item of an entity record, or any similar data item related to an entity record.

In some embodiments, the at least one clustering engine of the illustrative ingestion module may be based on a deep machine learning algorithm architecture and may include at least one input layer, at least one hidden layer, and at least one output layer. The at least one clustering engine processing as input feature vectors of an entity record, through a numerical optimization of weights and connections of the at least one hidden layer to derive an output layer representing embeddings of feature vectors of the input of the multiple entity records. The at least one clustering engine is not limited to utilizing a deep machine learning algorithm architecture but may utilize any type of machine learning architecture such as a gradient boost, random forest, naïve bayes, support vector, decision tree, logistic regression, linear regression, or any similar type of architecture capable of determining embeddings of feature vectors of multiple entity records.

In some embodiments the at least one clustering engine of the illustrative ingestion module may be configured to map clusters of data item feature vectors associated with the multiple entity records and at least one set of candidate entity feature vectors. The illustrative clustering engine may determine clusters based on model parameters related to feature vectors of the multiple entity record data items such as for example the strengths of connections and weights of the model.

In some embodiments, the illustrative ingestion module may be configured to merge by the at least one processor(s) the entity records determined to share a high similarity within a cluster. The at least one processor(s) may determine a high similarity between entity records by utilizing a hamming distance, a Jaccard similarity, Euclidean distance, or any similar measure capable of determining similarity. The at least one processor(s) of the illustrative ingestion module may be configured to apply a threshold to the similarity measure to determine the entity records that belong to the high similarity group of entity records and the multiple entity records.

In some embodiments, the illustrative ingestion module may be configured with at least one ingestion engine. For each of the index associated with each cluster the at least one ingestion engine may be configured to index the feature vectors into a sector of an elastic search environment. In some embodiments, the at least one ingestion engine may be configured to index feature vectors into a sector of an elastic search environment based in part on a classification of the entity records. In some embodiments the at least one ingestion engine may determine a correlation between a classification of the multiple entity records and feature vectors determined to be associated with clusters by the at least one clustering engine, and index into a sector of an elastic search environment the cluster of each entity record correlated to a classification into a sector of an elastic search environment.

In some embodiments the illustrative ingestion module may be configured with at least one blocking engine. The at least one blocking engine may be based on a deep machine learning algorithm architecture and may include at least one input layer, at least one hidden layer, and at least one output layer. The at least one blocking engine processing as input an entity record, through a numerical optimization of weights and connections of the at least one hidden layer to derive an output layer representing embeddings of feature vectors of the input of the multiple entity records. The at least one blocking engine is not limited to utilizing a deep machine learning algorithm architecture but may utilize any type of machine learning architecture such as a gradient boost, random forest, naïve bayes, support vector, decision tree, logistic regression, linear regression, or any similar type of architecture capable of determining embeddings of feature vectors of multiple entity records.

In some embodiments the at least one blocking engine of the illustrative ingestion module may be configured to map clusters of data item feature vectors associated with the multiple entity records having a high similarity and indexed into the enhanced elastic search environment and at least one query of an entity record. The illustrative clustering engine may determine clusters based on model parameters related to feature vectors of the multiple entity record data items such as for example the strengths of connections and weights of the model.

In some embodiments the at least one blocking engine of the illustrative ingestion module may be configured to map clusters of feature vectors in the index associated with the set of high similarity entity records and at least one query entity record. In some embodiments, the illustrative ingestion module may receive a query record related to the multiple entity records that were previously processed by the at least one blocking engine and indexed by the ingestion engine into an index.

In some embodiments, the at least one processor(s) of the illustrative ingestion module may merge a second set of entity records associated with at least one query record and the corresponding set of clusters having a high similarity entity records.

In some embodiments, the at least one processor(s) of the illustrative ingestion module may display on the output device interface, the merged second set of entity records associated with the at least one query record.

In some embodiments the illustrative ingestion module may be configured to receive a query record of an entity record. The query may include information related to an entity record for example a zip code, a portion of a zip code, an area code of a telephone number, a trigram of a portion of numeric string and/or text, and/or any similar data item related to an entity record and/or any combinations thereof. The query may be processed in a similar manner to that of processing of the candidate entity record associated with a plurality of entity records where feature vectors are determined for the query.

In some embodiments the illustrative ingestion module may retrieve a plurality of entity record feature vectors from the second set of merged entity records, the second set of merged entity records then processed by at least one blocking engine. The at least one blocking engine may be configured to map clusters of data item feature vectors associated with the second set of merged entity records having a high similarity with the at least one query record. The at least one processor(s) may utilize a distance measure to determine a high similarity group of the entity records, the distance measure calculated between an edge and a center point of the cluster and based on the measurement determine a threshold for a set of high similarity entity records between those two points. The merge engine may be configured to merge the high similarity entity records with the at least one query record.

FIG. 1 depicts an illustration of an exemplary computer-based system and platform configured to utilize natural language processing machine learning models to refine data associated with entity records indexed in an enhanced elastic search environment in accordance with one or more embodiments of the present disclosure.

In some embodiments, the illustrative ingestion module 200 may be configured as an independent module communicatively coupled to a network 120. In some embodiments, the illustrative ingestion module 200 may be configured to operate in a cloud platform 118, in a server device 102 or server device 110 having a processor and memory, and communicatively coupled to a network database 108 or network database 116, or it may be configured to operate in a personal computing device 122 or a mobile computing device 123. In some embodiments, a user 124 may access the illustrative ingestion module 200 by a personal computing device 122 or a mobile computing device 123, or any similar type of computing device capable of communicating with the system.

In some embodiments, the illustrative ingestion module 200 may retrieve multiple data items associated with multiple entity records, the entity records corresponding to at least one candidate entity record, and the at least one candidate entity record associated with at least one classification. The illustrative ingestion module 200 may utilize a clustering engine 216 and a blocking engine 218 to determine matches of the at least one candidate entity record to each respective entity records and the merge engine 219 to merge the entity records. The plurality of entity records may include duplicates, errors such as for example, misspellings and/or omissions or similar types or combinations thereof of variations that differ from the at least one candidate entity record.

In some embodiments, the multiple entity records may include a quantity data item that may represent a quantity associated with an attribute of each entity record. The multiple entity records may include an entity name data item. The multiple entity records may include an entity address item that may represent an attribute such as an address associated with each entity record. The multiple entity records may include a second set of data items representing at least one attribute associated with the at least one candidate entity record, the second set of data items may include a merged set of the multiple data items. In some embodiments, the multiple entity records may include any one or more of the above data items, among other data items, individually or in any combination thereof.

In some embodiments, the illustrative ingestion module 200 may retrieve multiple entity records from a storage system located on a network 120, a cloud platform 118, a network database 108, a network database 116, a mobile computing device 123, a personal computing device 122, or any similar computing device capable of storing a multiple entity records.

Figure 2:
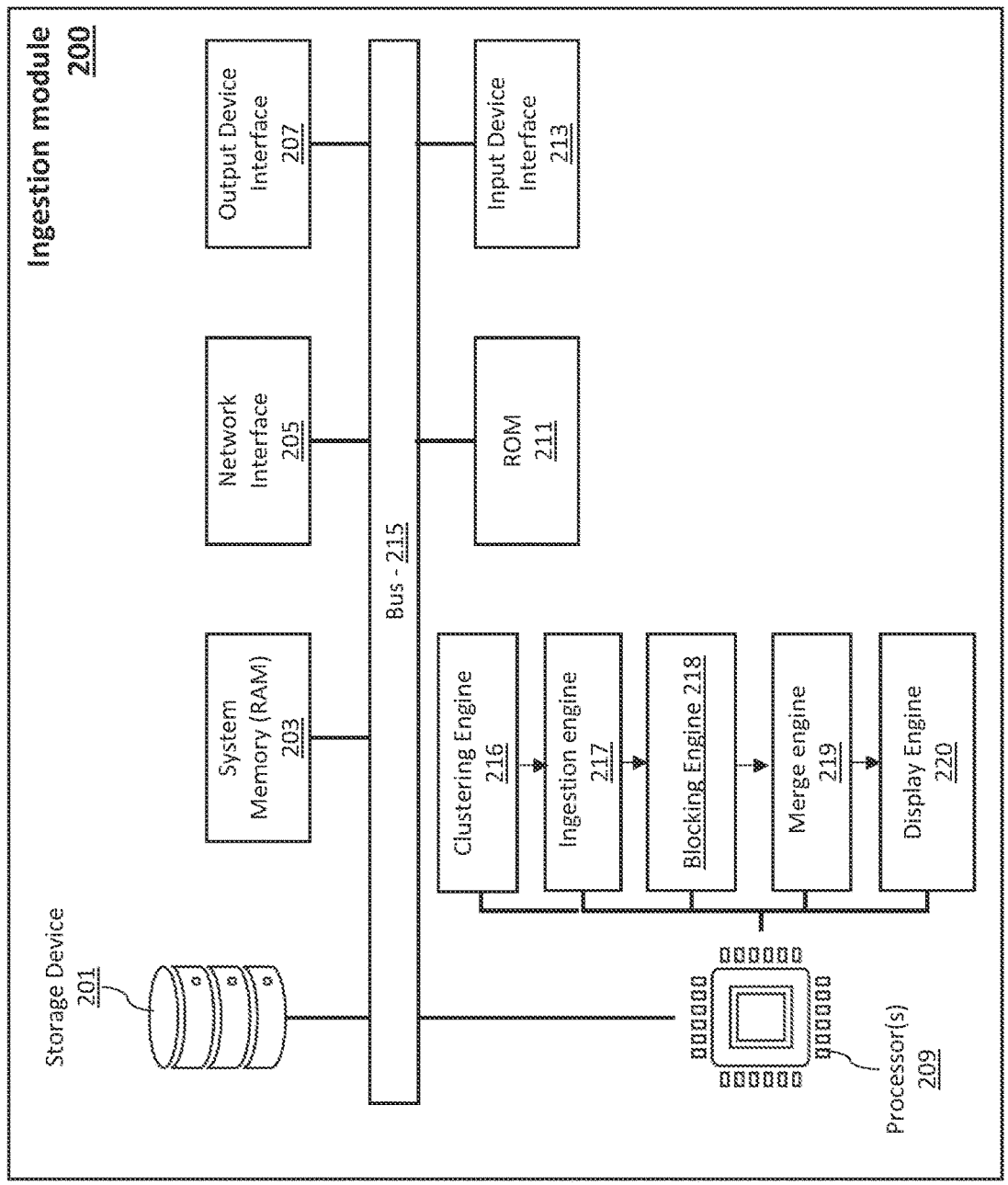
FIG. 2 depicts a block diagram of an exemplary computer-based ingestion module for resolving entity records utilizing natural language processing models in an enhanced search environment accordance with one or more embodiments of the present disclosure.

FIG. 2 depicts a block diagram of an exemplary computer-based ingestion module for resolving entity records utilizing natural language processing models in an enhanced search environment in accordance with one or more embodiments of the present disclosure.

In some embodiments, the illustrative ingestion module 200 may be configured with a bus 215 in communication with a storage device 201, a system memory (RAM) 203, a network interface 205 communicatively coupled to at least one computer-implemented system, a ROM 211, an output device interface 207, an input device interface 213, at least one processor(s) 209, at least one blocking engine 216 (first natural language processing model) capable of determining embeddings of feature vectors between data items associated with entity records, an ingestion engine 217 capable of indexing into an enhanced elastic search environment the entity records determined to share similar embeddings by the blocking engine 216, a blocking engine 218 (second natural language processing model) capable of determining embeddings between data items associated with entity records indexed in the enhanced elastic search environment based on a query of an entity record, a merge engine 219, capable of merging entity records that have been determined to share similar embeddings, and a display engine 220 capable of displaying on an output device interface 207, an output pertaining to a merged entity record.

In some embodiments, the illustrative ingestion module 200 may retrieve multiple entity records from a storage device 201 and utilize a single data item of an entity record to resolve an entity record from the multiple entity records. In some embodiments the illustrative ingestion module 200 may resolve an entity record from multiple entity records based on multiple data items or all the data items of each entity record of the multiple entity records.

In some embodiments, the at least one processor(s) 209 of the illustrative ingestion module 200 may determine a classification of the multiple entity records retrieved from a storage device 201. The classification may be based on at least one data item of the entity record for example an area code, or a zip code data item of the entity record or any similar data item. The at least one processor(s) 209 may utilize a set of predetermined categories to determine a classification of the multiple entity records stored in a storage device 201. The predetermined categories may include groups of business records sorted by type of business, for example one category may be "auto repair" and the group may include a set of entity records that are within this category. The predetermined categories may include text or numeric characters such as "automobile repair" or an area code such as "847". The at least one processor(s) 209 may convert portions of software code containing multiple entity records from one software language to another software language to determine a classification for example from Scala or spark to python, the conversion from one software language to another resulting in a refined resolution of the data items corresponding to an entity record. The at least one processor(s) 209 may convert a string of text of an entity record to a numeric character. The at least one processor(s) may utilize general syntax such as for example as found in the Python programming language where "int("string of text")" returns the integer equivalent of the "string of text" similar syntax may be used from multiple languages or in combinations thereof. The at least one processor(s) 209 may determine a similarity between entity records based on a hamming distance, Jaccard similarity, Euclidean distance, or a similar manner of determining a similarity between entity records.

In some embodiments, the at least one processor(s) 209 of the illustrative ingestion module 200 may randomly sample the set of entity records stored in storage device 201 to automatically determine a set of classification categories for the entity records. The illustrative ingestion module 200 may utilize this set of classification categories to organize the set of entity records.

In some embodiments the illustrative ingestion module 200 may utilize the at least one processor(s) 209 to augment an entity record associated with a classification category. The augmentation may include at least one text or at least one numeric character, or it may include a sentence, among other labels indicative of a classification or any combination thereof. The augmentation may include documentation about a particular data item, the entity records as a whole, or an entire classification category. The information included in the augmentation utilized by the system to improve information processing by enabling finer resolution of the entity record.

In some embodiments, the at least one processor(s) 209 may determine a set of entity feature vectors associated with each respective entity records based at least in part on each data item pertaining to the multiple entity records. The feature vector may be determined by utilizing a data item of the entity record for example a zip code, a portion of a zip code, an area code of a telephone number, a trigram of a portion of text of a data item of an entity record, or any similar data item related to an entity record. The feature vector may be generated by utilizing the entire entity record, or it may be generated by sampling an attribute of the entity record such as for example the area code of a telephone number, and/or the first three numbers of a zip code associated with an entity record. The feature vector may be generated by randomly sampling a portion of the entity record.

In some embodiments, the illustrative ingestion module 200 may be configured with at least one blocking engine 216. The at least one blocking engine 216 may be based on a deep machine learning algorithm architecture and may include at least one input layer, at least one hidden layer, and at least one output layer. The at least one blocking engine 216 processing as input, feature vectors of an entity record. The at least one blocking engine 216 numerically optimizes weights and connections of the at least one hidden layer to derive an output layer representing embeddings of feature vectors of the input of the multiple entity records. The at least one blocking engine 216 may utilize any type of machine learning architecture such as a gradient boost, random forest, naïve bayes, support vector, decision tree, logistic regression, linear regression, or any similar type of architecture capable of determining embeddings of feature vectors of multiple entity records.

In some embodiments, the at least one blocking engine 216 of the illustrative ingestion module 200 may be configured to map clusters of data item feature vectors associated with the multiple entity records and at least one set of candidate entity feature vectors. The illustrative blocking engine 216 may determine clusters based on model parameters related to feature vectors of the multiple entity record data items such as for example the strengths of connections and weights. In some embodiments the at least one processor(s) 209 of the illustrative ingestion module 200 may be configured to map clusters of the feature vectors related to the model parameters. The at least one processor(s) or the at least one blocking engine 216 may utilize any type of model capable of mapping clusters of feature vectors such as k-means, centroid, DBSCAN, fuzzy clustering, spectral clustering, expectation maximization or any similar type of clustering model that is capable of clustering feature vectors of entity records.

In some embodiments, the at least one processor(s) 209 of the illustrative ingestion module 200 may be configured to merge the entity records determined to share a high similarity within a cluster. In some embodiments a threshold may be applied to cluster based on a distance from the center of the cluster, and high similarity entity records may be determined within a standard deviation of that distance. The at least one processor(s) is not limited to utilizing a threshold and standard deviation to determine high similarity of entity records, any similar type of measure for determining a correlative relationship within a cluster of entity records may be employed. The at least one processor(s) 209 may utilize a distance measure to determine a high similarity group of the entity records, the distance measure calculated from the center of the cluster. The at least one processor(s) 209 may for example determine an edge of a cluster and determine a distance between an edge and a center point of the cluster and based on that measurement determine a threshold for a set of high similarity entity records between those two points.

In some embodiments, the at least one processor(s) 209 may determine a threshold for a set of high similarity entity records by utilizing a hamming distance, a Jaccard similarity, Euclidean distance, or any similar measure capable of determining similarity. The at least one processor(s) 209 of the illustrative ingestion module 200 may be configured to apply a threshold to the similarity measure to determine the entity records that belong to the high similarity group of entity records associated with at least one candidate entity record.

In some embodiments, the illustrative ingestion module 200 may be configured with at least one ingestion engine 217. The at least one ingestion engine 217 may be configured to index feature vectors determined to be associated with clusters of the set of high similarity entity records by the at least one blocking engine 216 into a sector of an elastic search environment. In some embodiments, the at least one ingestion engine 217 may be configured to index feature vectors determined to be associated with clusters of the set of high similarity entity records into a sector of an elastic search environment based in part on a classification of the entity records. In some embodiments the at least one ingestion engine 217 may determine a correlation between a classification of the multiple entity records and feature vectors determined to be associated with clusters of the high similarity entity records by the at least one blocking engine 216, and index into a sector of an elastic search environment the cluster of each entity record correlated to a classification into a sector of an elastic search environment.

In some embodiments, the at least one processor(s) 209 of the illustrative ingestion module 200 may retrieve a list of predetermined classification categories from storage device 201 to determine a classification of the entity record feature vectors processed by the at least one blocking engine 216. The at least one ingestion engine 217 may utilize this list of classification categories to index into the enhanced elastic search, the feature vectors determined to be associated with clusters of the high similarity entity records.

In some embodiments the illustrative ingestion module 200 may be configured with at least one blocking engine 218. The at least one blocking engine 218 may be based on a deep machine learning algorithm architecture and may include at least one input layer, at least one hidden layer, and at least one output layer. The at least one blocking engine 218 processing as input, feature vectors of an entity record, numerically optimizes weights and connections of the at least one hidden layer to derive an output layer representing embeddings of feature vectors of the input of the multiple entity records. The at least one blocking engine 218 is not limited to utilizing a deep machine learning algorithm architecture but may utilize any type of machine learning architecture such as a gradient boost, random forest, naïve bayes, support vector, decision tree, logistic regression, linear regression, or any similar type of architecture capable of determining embeddings of feature vectors of multiple entity records.

In some embodiments, the illustrative ingestion module 200 may be configured to receive at least one query of an entity record. In some embodiments the at least one blocking engine 218 of the illustrative ingestion module 200 may be configured to map clusters of feature vectors indexed in the enhanced elastic search environment associated with the set of high similarity entity records based on the at least one query entity record. In some embodiments, the illustrative ingestion module may receive a query related to the multiple entity records that were previously processed by the at least one blocking engine and indexed by the ingestion engine into an index.

In some embodiments the at least one blocking engine 218 may determine clusters based on model parameters related to feature vectors of the multiple high similarity entity records indexed into the enhanced elastic search environment. The at least one blocking engine 218 may determine clusters based on model parameters such as for example the strengths of connections and weights of the model. In some embodiments the at least one processor(s) 209 of the illustrative ingestion module 200 may be configured to map clusters of the feature vectors related to the model parameters. The at least one processor(s) 209 or the at least one blocking engine 218 may utilize any type of model capable of mapping clusters of feature vectors such as k-means, centroid, DBSCAN, fuzzy clustering, spectral clustering, expectation maximization or any similar type of clustering model that is capable of clustering feature vectors of entity records. In some embodiments, the at least one merge engine 219 of the illustrative ingestion module 200 may be configured to merge a second set of entity records having a high similarity with the respective candidate entity records. In some embodiments, the at least one processor(s) 209 may determine a threshold for a set of high similarity entity records by utilizing a hamming distance, a Jaccard similarity, Euclidean distance, or any similar measure capable of determining similarity. The at least one processor(s) 209 of the illustrative ingestion module 200 may be configured to apply a threshold to the similarity measure to determine the entity records that belong to the high similarity group of entity records associated with at least one candidate entity record and merge the entity records with the respective candidate entity records into a second set of entity records.

In some embodiments, the illustrative ingestion module 200 may receive a query record related to the second set of entity records multiple entity records that were previously processed by the at least one blocking engine and indexed by the ingestion engine into an index.

In some embodiments, the at least one processor(s) of the illustrative ingestion module 200 may merge a second set of entity records associated with at least one query record and the corresponding set of clusters having a high similarity entity records.

In some embodiments, the at least one processor(s) 209 of the illustrative ingestion module may display on the output device interface, the merged second set of entity records associated with the at least one query record.

In some embodiments the illustrative ingestion module 200 may be configured to receive a query record of an entity record. The query may include information related to an entity record for example a zip code, a portion of a zip code, an area code of a telephone number, a trigram of a portion of numeric string and/or text, and/or any similar data item related to an entity record and/or any combinations thereof. The query may be processed in a similar manner to that of processing of the candidate entity record associated with a plurality of entity records where feature vectors are determined for the query.

In some embodiments the illustrative ingestion module 200 may retrieve a plurality of entity record feature vectors from the second set of merged entity records, the second set of merged entity records then processed by the at least one blocking engine 218. The at least one blocking engine 218 may be configured to map clusters of data item feature vectors associated with the second set of merged entity records having a high similarity with the at least one query record. The at least one processor(s) 209 may utilize a distance measure to determine a high similarity group of the entity records, the distance measure calculated between an edge and a center point of the cluster and based on the measurement determine a threshold for a set of high similarity entity records between those two points. The merge engine may be configured to merge the high similarity entity records with the at least one query record.

In some embodiments, the at least one display engine 220 of the illustrative ingestion module 200 may be configured to display on the output device interface 207, the merged second set of entity records associated with the at least one query.

Figure 3:
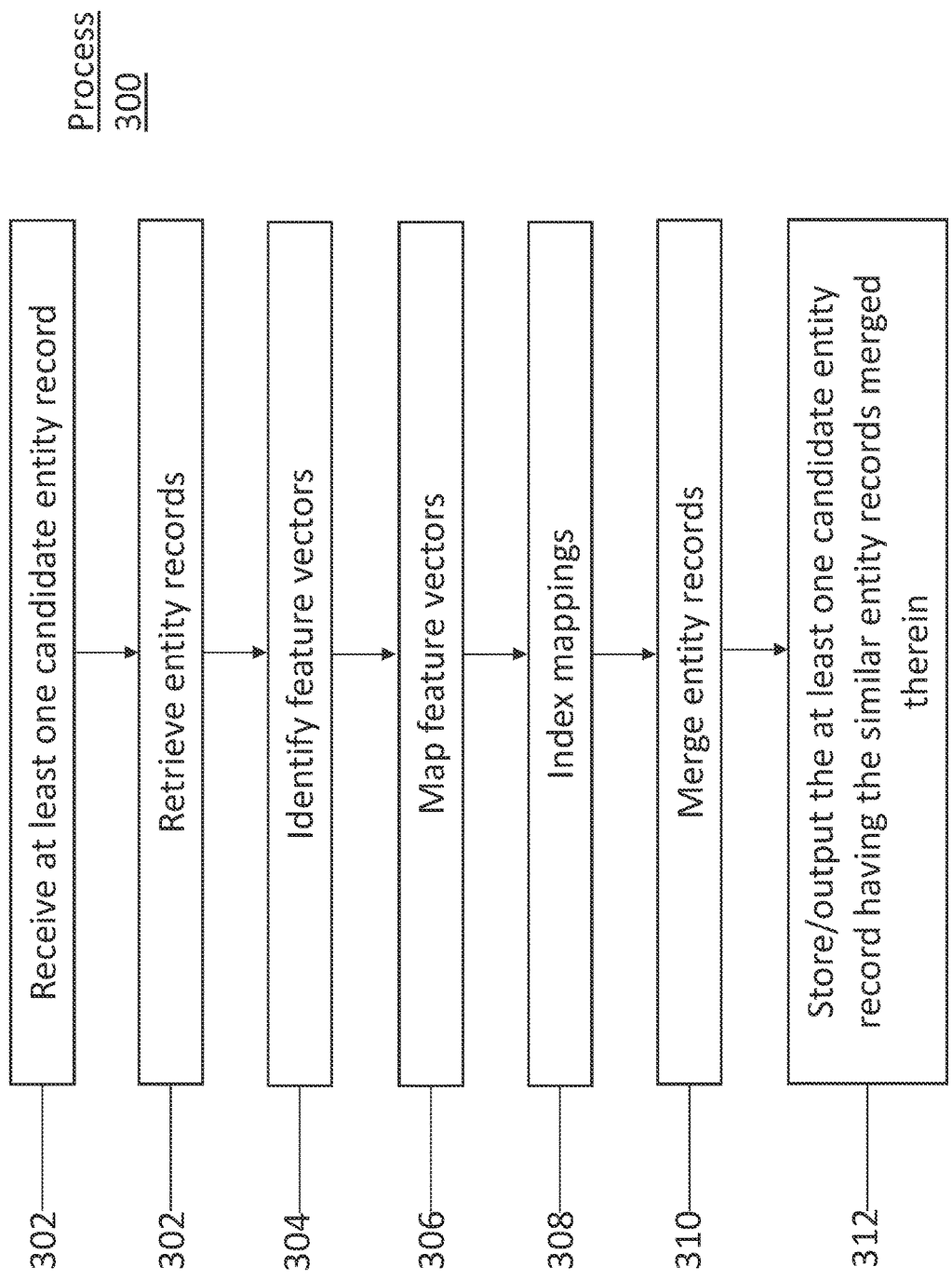
FIG. 3 is a flowchart illustrating operational steps of automatically resolving entity records utilizing natural language processing models in an enhanced elastic search environment, in accordance with one or more embodiments of the present disclosure.

FIG. 3 is a flowchart illustrating operational steps of automatically resolving entity records utilizing natural language processing models in an enhanced elastic search environment, in accordance with one or more embodiments of the present disclosure.

In some embodiments, the illustrative ingestion module 200 of the present disclosure may be configured to carry out the operational steps of process 300 in FIG. 3. In some embodiments the at least one processor(s) 209 may be configured to carry out the operational steps of process 300 in FIG. 3. In some embodiments, the operational steps of process 300 of FIG. 3 may be carried out by any of a cloud platform 118, a network 120, a server device 102, a server device 110, a personal computing device 122, a mobile computing device 123, or any similar computing device capable of carrying out the operational steps of process 300.

In some embodiments, at Step 302 of FIG. 3 the illustrative ingestion module 200 utilizes the at least one processor(s) 209 to receive from storage device 201 multiple data items associated with multiple entity records corresponding to at least one entity record, the entity record associated with at least one candidate entity record. For example, in some embodiments, the ingestion module 200 may access entity records representative of one or more commercial entities, such as stores, corporations, merchants, service providers, among others or any combination thereof. The entity records for the commercial entities may include data items representative of details associated with the commercial entities. For example, the data items may be representative of, e.g., a business's legal name, an address of a store, headquarters or other place of business, a telephone number, a contact person, a merchant category code, among others or any combination thereof. Other entity records in other contexts may be employed so as to more efficiently search records, e.g., for deduplication, reconciliation, user search, among other database management tasks or any combination thereof. Indeed, the principles detailed herein are not limited to data records pertaining to entities, but rather may include data records representing one or more of any number of subjects, such as transaction records, electronic messages (e.g., emails, internet messaging or chat messages, SMS and/or MMS messages, among others or any combination thereof), or any other data records or any combination thereof.

In some embodiments the at least one processor(s) 209 may retrieve the multiple data items from a network database 108, a network database 116, a cloud platform 118, a personal computing device 122, a mobile computing device 123 or any other device capable of storing multiple entity records. For example, the entity records may be retrieved from one or more databases of a financial institution, merchant, or other system maintaining entity data for entities for which they are associated.

In some embodiments, the at least one processor(s) 209 of the illustrative ingestion module 200 may determine a classification of the multiple entity records retrieved from a storage device 201. The classification may be based on at least one data item of the entity record for example an area code, or a zip code data item of the entity record or any similar data item, e.g., a business's legal name, an address of a store, headquarters or other place of business, a telephone number, a contact person, a merchant category code, among others or any combination thereof. The at least one processor(s) 209 may utilize a set of predetermined categories to determine a classification of the multiple entity records stored in a storage device 201, the predetermined classification categories may be of any format any length or any type of augmentation and are not limited to a particular format or length.

In some embodiments, the predetermined classification categories may include a list of at least one numeric character or text that categorize entities conforming to associated definitions. The text may for example include text of similarly related entity record business types such as, automobile, automobile repair, automobile dealer, etc. In some embodiments the list of predetermined classification categories may be at least one numeric character. The numeric character may for example include a series of numbers associated with an entity record such as a zip code, a telephone number, an account number, a street number or the like.

In some embodiments, the multiple data items associated with the multiple entity records may include a quantity data item that represents a quantity associated with an attribute of each entity record, an entity name data item representing an attribute as a name associated with each entity record, an entity address data item representing an attribute such as an address associated with an entity record, and a second set of data items representing at least one attribute associated with the at least one candidate entity record, wherein the second set of data items comprises a merged set of the multiple data items.

In some embodiments, at Step 304 the at least one processor(s) of the illustrative ingestion module 200 may be configured to generate a set of entity record feature vectors associated with each respective entity record based at least in part on each data item of each respective entity record. The feature vector may be determined by utilizing a data item of the entity record for example a zip code, a portion of a zip code, an area code of a telephone number, a trigram of a portion of text of a data item of an entity record, or any similar data item related to an entity record. Thus, data representative of the entity, such as the commercial entity and associated data items, may be encoded into a feature vector for ingestion by one or more machine learning models.

In some embodiments, at Step 306 the at least one processor(s) may identify at least one group of data item feature vectors associated with the multiple data items. The at least one group of data item feature vectors may be utilized as a group of data items by at least one machine learning model to resolve an entity record from a multiple entity records.

In some embodiments, at Step 308 the illustrative blocking engine 216 of the illustrative ingestion module 200 may be configured to map clusters of data item feature vectors associated with the multiple entity records and the at least one set of candidate entity feature vectors. Therefore, the blocking engine 216 may group entity records according to a measure of similarity between the respective feature vector of each entity record. In some embodiments, data entries may be matched according to a measure of similarity of individual or combinations of attributes represented in the data entries. In some embodiments, the measure of similarity may include, e.g., an exact match or a predetermined similarity score according to, e.g., Jaccard similarity, Jaro-Winkler similarity, Cosine similarity, Euclidean similarity, Overlap similarity, Pearson similarity, Approximate Nearest Neighbors, K-Nearest Neighbors, among other similarity measure. The predetermined similarity score may be any suitable similarity score according to the type of electronic activity to identify a measured attribute of any two data entries as the same.

In some embodiments, similarity may be measured between each individual attribute separately, and the respective similarity scores summed, averaged, or otherwise combined to produce a measure of similarity of two data entries. In some embodiments, the similarity may instead or in addition be measured for a combination of the device identifier, device type identifier and location identify. For example, a hash or group key may be generated by combining the device identifier, device type identifier and location identify. The hash may include a hash functioning take as input each of attribute or a subset of attributes of a particular data entry. The group key may be produced by creating a single string, list, or value from combining each of, e.g., a string, list or value representing each individual attribute of the particular data entry. The similarity between two data entries may then be measured as the similarity between the associated hashes and/or group keys. The measured similarity may then be compared against the predetermined similarity score to determine candidate data entries that are candidates as matching to each other.

The illustrative blocking engine 216 may determine clusters based on model parameters related to feature vectors of the multiple entity record data items such as for example the strengths of connections and weights of the model. In some embodiments, at Step 308 the at least one processor(s) 209 may utilize any type of model capable of mapping clusters of feature vectors such as k-means, centroid, DBSCAN, fuzzy clustering, spectral clustering, expectation maximization or any similar type of clustering model that is capable of clustering feature vectors of entity records.

In some embodiments, at Step 310 the at least one processor(s) 209 of the illustrative ingestion module 200 may be configured to merge the entity records determined to share a high similarity within a cluster, such as entity records having a similar exceeding a predetermined similarity threshold of the similarity measure. The at least one processor(s) 209 may utilize a distance measure to determine a high similarity group of the entity records, the distance measure calculated between an edge and a center point of the cluster and based on the measurement determine a threshold for a set of high similarity entity records between those two points.

In some embodiments, at Step 312 the ingestion engine 217 of the illustrative ingestion module 200 may be configured to index the entity records into an enhanced elastic search index. In some embodiments, the at least one ingestion engine 217 may be configured to index feature vectors determined to be associated with clusters of the set of high similarity entity records into a sector of an elastic search environment based in part on a classification of the entity records. In some embodiments the at least one ingestion engine 217 may determine a correlation between the classification (as detailed above) of the multiple entity records and feature vectors determined to be associated with clusters of the high similarity entity records by the at least one blocking engine 216 and indexed into a sector of an elastic search environment the cluster of each entity record correlated to the classification into a sector of an elastic search environment.

Figure 4:
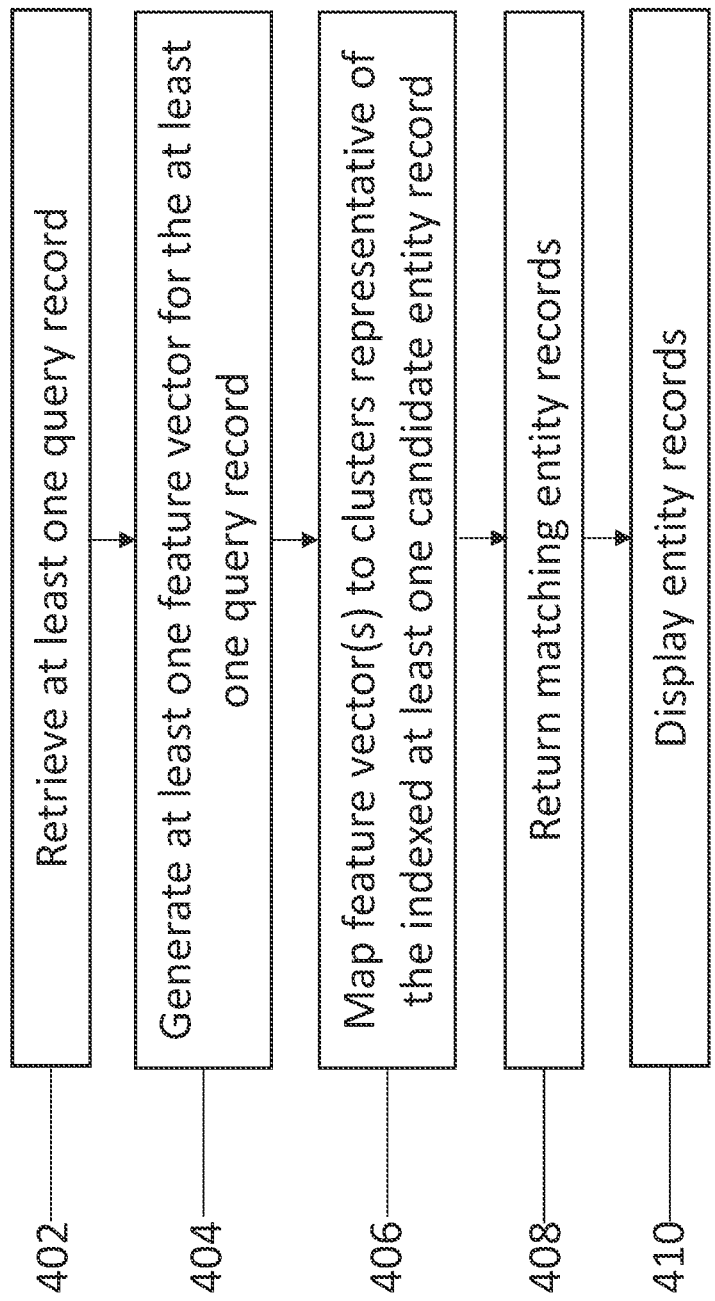
FIG. 4 is a flowchart illustrating operational steps of automatically resolving entity records utilizing natural language processing models in an enhanced elastic search environment, in accordance with one or more embodiments of the present disclosure.

FIG. 4 is a flowchart illustrating operational steps of process 400 for automatically returning search results to a query by resolving at least one query record with indexed entity records utilizing natural language processing models in an enhanced elastic search environment, in accordance with one or more embodiments of the present disclosure.

In some embodiments, at Step 402 at least one blocking engine 218 of the illustrative ingestion module 200 may be configured to receive a search query for entity records, wherein the search query includes at least one query record. In some embodiments, the at least one query record may be a searched query record, or may be an artificial entity record generated from user inputs into search field(s), e.g., specifying an entity name, address, telephone number, representative, etc. Thus, the query record(s) may include data representative of a known or unknown entity being searched, such as, e.g., entities matching a location/geographic area, entity type, entity name, etc. Therefore, query record(s) may be used to determine additional entity information from pre-indexed entity records, e.g., indexed according to the pipeline detailed above with reference to FIG. 3. To do so, upon receiving the query record(s), feature vector(s) may be determined, mapped to clusters and matched to a high similarity candidate entity record via a similar processor to FIG. 3 detailed above. As a result, a common pipeline can be used to efficient entity record resolution and search.

In some embodiments, at Step 404 the at least one processor(s) of the illustrative ingestion module 200 may determine feature vectors of the at least one query record, e.g., similar to the feature vector extraction of step 304 as detailed above in reference to FIG. 3.

In some embodiments, at Step 406 the at least one blocking engine 218 of the illustrative ingestion module 200 may be configured to map the feature vector(s) of the query record(s) to one or more clusters of feature vectors indexed in the enhanced elastic search environment associated with the second set of high similarity entity records based on the at least one query entity record, e.g., via a similar process to step 306 of FIG. 3 as detailed above.

In some embodiments, at Step 408 the at least one merge engine 219 of the illustrative ingestion module 200 may be configured to return, in response to the query record(s) a set of search results including the second set of entity records associated with at least one query record and the corresponding set of clusters having a high similarity entity records. Accordingly, the merge engine 219 may provide a response to the search query based on a processing of the query record via a similar pipeline to merging entity records, e.g., as detailed above in reference to FIG. 3.

In some embodiments, at Step 410 the at least one display engine 220 of the illustrative ingestion module 200 may be configured to display on the output device interface 207, the merged second set of entity records associated with the at least one query.

Figure 5:
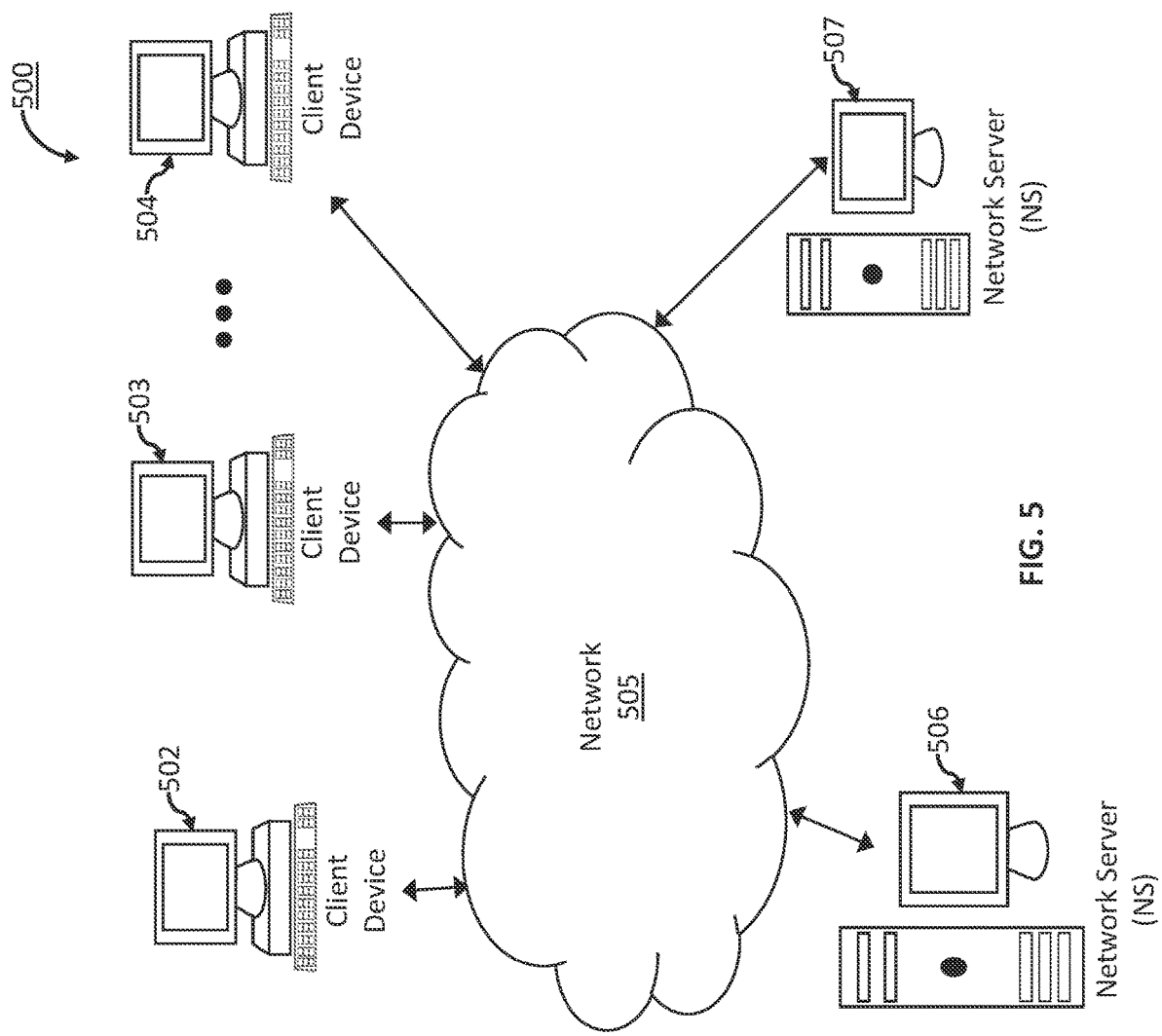
FIG. 5 depicts a block diagram of an exemplary computer-based system and platform 500 in accordance with one or more embodiments of the present disclosure.

FIG. 5 depicts a block diagram of an exemplary computer-based system and platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 500 may be configured to manage a large number of members and concurrent transactions, as detailed herein. In some embodiments, the exemplary computer-based system and platform 500 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 5, client device 502, client device 503 through client device 504 (e.g., clients) of the exemplary computer-based system and platform 500 may include virtually any computing device capable of receiving and sending a message over a network (e.g., cloud network), such as network 505, to and from another computing device, such as servers 506 and 507, each other, and the like. In some embodiments, the client devices 502 through 504 may be personal computers, multiprocessor systems, microprocessor-based or programmable consumer electronics, network PCs, and the like. In some embodiments, one or more client devices within client devices 502 through 504 may include computing devices that typically connect using a wireless communications medium such as cell phones, smart phones, pagers, walkie talkies, radio frequency (RF) devices, infrared (IR) devices, CBs citizens band radio, integrated devices combining one or more of the preceding devices, or virtually any mobile computing device, and the like. In some embodiments, one or more client devices within client devices 502 through 504 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, etc.). In some embodiments, one or more client devices within client devices 502 through 504 may include may run one or more applications, such as Internet browsers, mobile applications, voice calls, video games, videoconferencing, and email, among others. In some embodiments, one or more client devices within client devices 502 through 504 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a client device within client devices 502 through 504 may be specifically programmed by either Java, .Net, QT, C, C++, Python, PHP and/or other suitable programming language. In some embodiment of the device software, device control may be distributed between multiple standalone applications. In some embodiments, software components/applications can be updated and redeployed remotely as individual units or as a full software suite. In some embodiments, a client device may periodically report status or send alerts over text or email. In some embodiments, a client device may contain a data recorder which is remotely downloadable by the user using network protocols such as FTP, SSH, or other file transfer mechanisms. In some embodiments, a client device may provide several levels of user interface, for example, advance user, standard user. In some embodiments, one or more client devices within client devices 502 through 504 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 505 may provide network access, data transport and/or other services to any computing device coupled to it. In some embodiments, the exemplary network 505 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 505 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 505 may include and implement, as an alternative or in conjunction with one or more of the above, a WiMAX architecture defined by the WiMAX forum. In some embodiments and, optionally, in combination of any embodiment described above or below, the exemplary network 505 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 505 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, OFDM, OFDMA, LTE, satellite and any combination thereof. In some embodiments, the exemplary network 505 may also include mass storage, such as network attached storage (NAS), a storage area network (SAN), a content delivery network (CDN) or other forms of computer or machine readable media.

In some embodiments, the exemplary server 506 or the exemplary server 507 may be a web server (or a series of servers) running a network operating system, examples of which may include but are not limited to Apache on Linux or Microsoft IIS (Internet Information Services). In some embodiments, the exemplary server 506 or the exemplary server 507 may be used for and/or provide cloud and/or network computing. Although not shown in FIG. 5, in some embodiments, the exemplary server 506 or the exemplary server 507 may have connections to external systems like email, SMS messaging, text messaging, ad content providers, etc. Any of the features of the exemplary server 506 may be also implemented in the exemplary server 507 and vice versa.

In some embodiments, one or more of the exemplary servers 506 and 507 may be specifically programmed to perform, in non-limiting example, as authentication servers, search servers, email servers, social networking services servers, Short Message Service (SMS) servers, Instant Messaging (IM) servers, Multimedia Messaging Service (MMS) servers, exchange servers, photo-sharing services servers, advertisement providing servers, financial/banking-related services servers, travel services servers, or any similarly suitable service-base servers for users of the client devices 502 through 504.

In some embodiments and, optionally, in combination of any embodiment described above or below, for example, one or more exemplary computing client devices 502 through 504, the exemplary server 506, and/or the exemplary server 507 may include a specifically programmed software module that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

In some embodiments, the exemplary computer-based systems/platforms, the exemplary inventive computer-based devices, and/or the exemplary inventive computer-based components of the present disclosure may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:
   i) Define Neural Network architecture/model,
   ii) Transfer the input data to the exemplary neural network model,
   iii) Train the exemplary model incrementally,
   iv) determine the accuracy for a specific number of timesteps,
   v) apply the exemplary trained model to process the newly-received input data,
   vi) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

At least some aspects of the present disclosure will now be described with reference to the following numbered clauses.

Clause 1. A computer-implemented method comprising: receiving, by at least one processor, multiple data items associated with multiple entity records corresponding to at least one candidate entity record, the at least one candidate entity record being associated with at least one classification; wherein each of the multiple data items associated with the multiple entity records comprises: i) a quantity data item representing a quantity associated with an attribute of each entity record; ii) an entity name data item representing an attribute as a name associated with each entity record; iii) an entity address data item representing an attribute such as an address associated with each entity record; iv) a second set of data items representing at least one attribute associated with the at least one candidate entity record, wherein the second set of data items comprises a merged set of the multiple data items; generating, by the at least one processor, a respective set of entity feature vectors associated with each respective entity record based at least in part on each data item of each respective entity record; identifying, by the at least one processor, at least one group of data item feature vectors associated with the multiple data items; utilizing, by the at least one processor, at least one machine learning model to map the multiple entity records to clusters based on the set of entity feature vectors, the feature vectors pertaining to the at least one group of data item feature vectors associated with the multiple data items and the at least one set of candidate entity feature vectors; merging, by the at least one processor, a set of high similarity entity records based on the entity records exceeding a similarity threshold applied to the clusters; utilizing, by the at least one processor, an ingestion module to automatically index clusters of feature vectors into an elastic search, each cluster associated with the at least one candidate entity record; wherein the ingestion module is configured to: index the clusters based on feature vectors determined by the machine learning model based in part on a classification; utilizing, by at least one processor, at least one machine learning model to map a second set of clusters of the feature vectors in the index associated with the set of high similarity entity records and at least one query entity record; merging, by the at least one processor, a second set of entity records associated with at least one query entity record and the corresponding high similarity entity records; and displaying, by the at least one processor, at least one candidate entity record having the record attributes.

Clause 2. The computer-implemented method of clause 1, wherein the classification is based on pre-determined categories.

Clause 3. The computer-implemented method of clause 1, wherein the classification is based on a randomly sampled subset of at least one data item of the multiple entity records.

Clause 4. The computer-implemented method of clause 1, wherein an entity record is augmented based on a classification of the entity record.

Clause 5. The computer-implemented method of clause 4, wherein the augmentation is comprised of at least one sentence of text.

Clause 6. The computer-implemented method of clause 4, wherein the augmentation is comprised of at least one numeric character.

Clause 7. A system comprising: a non-transient computer memory, storing software instructions; and at least one processor of a first computing devices associated with a user; wherein, then at least one processor executes the software instructions, the first computing device is programmed to: receive, by at least one processor, multiple data items associated with multiple entity records corresponding to at least one candidate entity record, the at least one candidate entity record being associated with at least one classification; wherein each of the multiple data items associated with the multiple entity records comprises: i) a quantity data item representing a quantity associated with an attribute of each entity record; ii) an entity name data item representing an attribute as a name associated with each entity record; iii) an entity address data item representing an attribute as an address associated with each entity record; iv) a second set of data items representing at least one attribute associated with the at least one candidate entity record, wherein the second set of data items comprises a merged set of the multiple data items; generate, by the at least one processor, a respective set of entity feature vectors associated with each respective entity record based at least in part on each data item of each respective entity record; identify, by the at least one processor, at least one group of data item feature vectors associated with the multiple data items; utilize, by the at least one processor, at least one machine learning model to map the multiple entity records to clusters based on the set of entity feature vectors, the feature vectors pertaining to the at least one group of data item feature vectors associated with the multiple data items and the at least one set of candidate entity feature vectors; merge, by the at least one processor, a set of high similarity entity records based on the entity records exceeding a similarity threshold applied to the clusters; utilize, by the at least one processor, an ingestion module to automatically index clusters of feature vectors into an elastic search, each cluster associated with the at least one candidate entity record; wherein the ingestion module is configured to: index the clusters based on feature vectors determined by the machine learning model based in part on a classification; utilize, by at least one processor, at least one machine learning model to map a second set of clusters of the feature vectors in the index associated with the set of high similarity entity records and at least one query entity record; merge, by the at least one processor, a second set of entity records associated with at least one query entity record and the corresponding high similarity entity records; and display, by the at least one processor, at least one of a second set of entity records.

Clause 8. The system of clause 7, wherein the classification is based on pre-determined categories.

Clause 9. The system of clause 7, wherein the classification is based on a randomly sampled subset of at least one data item of the multiple entity records.

Clause 10. The system of clause 7, wherein an entity record is augmented based on a classification of the entity record.

Clause 11. The system of clause 10, wherein the augmentation is comprised of at least one sentence of text.

Clause 12. The system of clause 10, wherein the augmentation is comprised of at least one numeric character.

Clause 13. At least one computer-readable storage medium having encoded thereon software instructions that, when executed by at least one processor, cause the at least one processor to perform the steps to: receive, by at least one processor, multiple data items associated with multiple entity records corresponding to at least one candidate entity record, the at least one candidate entity record being associated with at least one classification; wherein each of the multiple data items associated with the multiple entity records comprises: i) a quantity data item representing a quantity associated with an attribute of each entity record; ii) an entity name data item representing an attribute as a name associated with each entity record; iii) an entity address data item representing an attribute as an address associated with each entity record; iv) a second set of data items representing at least one attribute associated with the at least one candidate entity record, wherein the second set of data items comprises a merged set of the multiple data items; generate, by the at least one processor, a respective set of entity feature vectors associated with each respective entity record based at least in part on each data item of each respective entity record; identify, by the at least one processor, at least one group of data item feature vectors associated with the multiple data items; utilize, by the at least one processor, at least one machine learning model to map the multiple entity records to clusters based on the set of entity feature vectors, the feature vectors pertaining to the at least one group of data item feature vectors associated with the multiple data items and the at least one set of candidate entity feature vectors; merge, by the at least one processor, a set of high similarity entity records based on the entity records exceeding a similarity threshold applied to the clusters; utilize, by the at least one processor, an ingestion module to automatically index clusters of feature vectors into an elastic search, each cluster associated with the at least one candidate entity record; wherein the ingestion module is configured to: index the clusters based on feature vectors determined by the machine learning model based in part on a classification; utilize, by at least one processor, at least one machine learning model to map a second set of clusters of the feature vectors in the index associated with the set of high similarity entity records and at least one query entity record; merge, by the at least one processor, a second set of entity records associated with at least one query entity record and the corresponding high similarity entity records; and display, by the at least one processor, at least one of a second set of entity records.

Clause 14. The at least one computer-readable storage medium of clause 13, wherein the classification is based on pre-determined categories.

Clause 15. The at least one computer-readable storage medium of clause 13, wherein the classification is based on a randomly sampled subset of at least one data item of the multiple entity records.

Clause 16. The at least one computer-readable storage medium of clause 13, wherein an entity record is augmented based on a classification of the entity record.

Clause 17. The at least one computer-readable storage medium of clause 16, wherein the augmentation is comprised of at least one sentence of text.

Clause 18. The at least one computer-readable storage medium of clause 16, wherein the augmentation is comprised of at least one numeric character.

Clause 19. The at least one computer-readable storage medium of clause 16, wherein the augmentation is comprised of at least a single text.

Throughout the specification, the following terms take the meanings explicitly associated herein, unless the context clearly dictates otherwise. The phrases "in one embodiment" and "in some embodiments" as used herein do not necessarily refer to the same embodiment(s), though it may.

Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/ configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) AmigaOS, AmigaOS 4, (2) FreeBSD, NetBSD, OpenBSD, (3) Linux, (4) Microsoft Windows, (5) OpenVMS, (6) OS X (Mac OS), (7) OS/2, (8) Solaris, (9) Tru64 UNIX, (10) VM, (11) Android, (12) Bada, (13) BlackBerry OS, (14) Firefox OS, (15) iOS, (16) Embedded Linux, (17) Palm OS, (18) Symbian, (19) Tizen, (20) WebOS, (21) Windows Mobile, (22) Windows Phone, (23) Adobe AIR, (24) Adobe Flash, (25) Adobe Shockwave, (26) Binary Runtime Environment for Wireless (BREW), (27) Cocoa (API), (28) Cocoa Touch, (29) Java Platforms, (30) JavaFX, (31) JavaFX Mobile, (32) Microsoft XNA, (33) Mono, (34) Mozilla Prism, XUL and XULRunner, (35) .NET Framework, (36) Silverlight, (37) Open Web Platform, (38) Oracle Database, (39) Qt, (40) SAP NetWeaver, (41) Smartface, (42) Vexi, and (43) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99, 999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app, etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™ Pager, Smartphone, or any other reasonable mobile electronic device.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

The aforementioned examples are, of course, illustrative and not restrictive.

What is claimed:

1. A computer-implemented method comprising:
    receiving, by at least one processor, a plurality of data items associated with a plurality of entity records corresponding to at least one candidate entity record, the at least one candidate entity record being associated with at least one classification;
    wherein the plurality of data items associated with the plurality of entity records comprise:
    i) a quantity data item representing a quantity associated with an attribute of each entity record;
    ii) an entity name data item representing an attribute as a name associated with each entity record;
    iii) an entity address data item representing an attribute such as an address associated with each entity record;
    iv) a second set of data items representing at least one attribute associated with the at least one candidate entity record, wherein the second set of data items comprises a merged set of the plurality of data items;
    generating, by the at least one processor, a set of entity feature vectors associated with the plurality of entity records based at least in part on the plurality of data items;
    identifying, by the at least one processor, at least one group of data item feature vectors associated with the plurality of data items;
    utilizing, by the at least one processor, at least one machine learning model to map the plurality of entity records to clusters based on the set of entity feature vectors, the feature vectors pertaining to the at least one group of data item feature vectors associated with the plurality of data items and the at least one set of candidate entity feature vectors;
    merging, by the at least one processor, a set of high similarity entity records based on the entity records exceeding a similarity threshold applied to the clusters;
    utilizing, by the at least one processor, an ingestion module to automatically index clusters of feature vectors into an elastic search, at least one cluster of clusters being associated with the at least one candidate entity record;
    wherein the ingestion module is configured to index the clusters based on feature vectors determined by the machine learning model based in part on a classification;
    utilizing, by at least one processor, at least one machine learning model to map a second set of clusters of the feature vectors in the index associated with the set of high similarity entity records and at least one query entity record;
    merging, by the at least one processor, a second set of entity records associated with at least one query entity record and the corresponding high similarity entity records; and
    displaying, by the at least one processor, at least one candidate entity record having the record attributes.

2. The computer-implemented method of claim 1, wherein the classification is based on pre-determined categories.

3. The computer-implemented method of claim 1, wherein the classification is based on a randomly sampled subset of at least one data item of the plurality of entity records.

4. The computer-implemented method of claim 1, wherein an entity record is augmented based on a classification of the entity record.

5. The computer-implemented method of claim 4, wherein the augmentation is comprised of at least one sentence of text.

6. The computer-implemented method of claim 4, wherein the augmentation is comprised of at least one numeric character.

7. A system comprising:
at least one processor in communication with a non-transient computer memory storing software instructions, wherein upon execution of the software instructions, the at least one processor is configured to:
receive, by at least one processor, a plurality of entity records, wherein the plurality of entity records comprise a plurality of data items;
utilize, by the at least one processor, at least one mapping machine learning model to map the plurality of entity records to clusters associated with a plurality of classifications based on the plurality of data items and a plurality of trained mapping parameters;
utilize, by the at least one processor, an ingestion module to automatically index the clusters into an elastic search based at least in part on a plurality of trained ingestion parameters;
receiving, by the at least one processor, a search query comprising at least one searched data item associated with at least one searched data record;
utilize, by the at least one processor, the at least one mapping machine learning model to map the at least one searched data record of the search query to a particular cluster in the index based at least in part on the at least search data item, the plurality of data items of the plurality of entity records in the particular cluster and the plurality of trained mapping parameters; and
return, by the at least one processor, at least one entity record of the plurality of entity records in the particular cluster as search results to the search query.

8. The system of claim 7, wherein the classification is based on pre-determined categories.

9. The system of claim 7, wherein the classification is based on a randomly sampled subset of at least one data item of the plurality of entity records.

10. The system of claim 7, wherein an entity record is augmented based on a classification of the entity record.

11. The system of claim 10, wherein the augmentation is comprised of at least one sentence of text.

12. The system of claim 10, wherein the augmentation is comprised of at least one numeric character.

13. At least one computer-readable storage medium having encoded thereon software instructions that, when executed by at least one processor, cause the at least one processor to perform steps to:
utilizing, by the at least one processor, an entity resolution machine learning pipeline to predict at least one set of matching entity records based at least in part on a plurality of data items of a plurality of entity records in a database;
merging, by the at least one processor, the at least one set of matching entity records into an entity record of the plurality of entity records;
utilizing, by the at least one processor, in response to a search query comprising a new entity record comprising at least one new data item, the entity resolution machine learning pipeline to predict at least one set of search result based at least in part on:
the at least one new data item of the new entity record, and
the plurality of data items of the plurality of entity records; and
returning, by the at least one processor, the at least one search result.

14. The at least one computer-readable storage medium of claim 13, wherein the classification is based on pre-determined categories.

15. The at least one computer-readable storage medium of claim 13, wherein the classification is based on a randomly sampled subset of at least one data item of the plurality of entity records.

16. The at least one computer-readable storage medium of claim 13, wherein an entity record is augmented based on a classification of the entity record.

17. The at least one computer-readable storage medium of claim 16, wherein the augmentation is comprised of at least one sentence of text.

18. The at least one computer-readable storage medium of claim 16, wherein the augmentation is comprised of at least one numeric character.

19. The at least one computer-readable storage medium of claim 16, wherein the augmentation is comprised of at least a single text.

* * * * *